United States Patent [19]
Lindert et al.

[11] Patent Number: 5,298,289
[45] Date of Patent: Mar. 29, 1994

[54] POLYPHENOL COMPOUNDS AND TREATMENT AND AFTER-TREATMENT OF METAL, PLASTIC AND PAINTED SURFACES THEREWITH

[75] Inventors: Andreas Lindert; Gerald J. Cormier, both of Troy; John R. Pierce, Huntington Woods, all of Mich.

[73] Assignee: Henkel Corporation, Plymouth Meeting, Pa.

[21] Appl. No.: 89,164

[22] Filed: Jul. 8, 1993

Related U.S. Application Data

[60] Continuation-in-part of Ser. No. 993,144, Dec. 18, 1992, which is a continuation of Ser. No. 853,479, Mar. 18, 1992, Pat. No. 5,266,410, which is a division of Ser. No. 710,885, Jun. 6, 1991, Pat. No. 5,116,912, which is a continuation of Ser. No. 128,672, Dec. 4, 1987, Pat. No. 5,039,770.

[51] Int. Cl.$^5$ .............................................. B05D 3/02
[52] U.S. Cl. .............................. 427/388.4; 427/393.5; 428/500; 428/461
[58] Field of Search .......................... 427/388.4, 393.5; 428/500, 461

Primary Examiner—Joseph L. Schofer
Assistant Examiner—N. Sarafin
Attorney, Agent, or Firm—Ernest G. Szoke; Wayne C. Jaeschke; Norvell E. Wisdom, Jr.

[57] ABSTRACT

A composition for treatment and after treatment of surfaces, especially metals, with derivatives of polyphenol compounds is provided. The derivatives include substituted aminomethyl groups on at least some of the phenyl rings in the polyphenol polymers, with molecular weights within the range of about 700 to about 70,000 being preferred. The compositions are particularly useful for treating chromated aluminum surfaces prior to painting, to improve corrosion resistance, and when combined with surfactants, for treating plastic and painted surfaces to improve rinsability without water breaks.

20 Claims, No Drawings

POLYPHENOL COMPOUNDS AND TREATMENT AND AFTER-TREATMENT OF METAL, PLASTIC AND PAINTED SURFACES THEREWITH

CROSS-REFERENCE TO RELATED APPLICATIONS

This application is a continuation-in-part of application Ser. No. 993,144 filed Dec. 18, 1992, pending which was a continuation of application Ser. No. 853,479 filed Mar. 18, 1992, now U.S. Pat. No. 5,266,410, which was a division of application Ser. No. 710,885 filed Jun. 6, 1991 and now U.S. Pat. No. 5,116,912, which was a continuation of application Ser. No. 128,672 filed Dec. 4, 1987 and now U.S. Pat. No. 5,039,770. The entire disclosure of U.S. Pat. No. 5,116,912, except for any part inconsistent with any explicit statement herein, is hereby incorporated herein by reference."

BACKGROUND OF THE INVENTION

1. Field of the Invention

This invention relates to the field of protective and-/or decorative surface treatment of articles, particularly metals and the like, to novel derivatives of polyphenol compounds useful in the treatment of the surface of various types, to surface treatment solutions or dispersions containing these novel polyphenol derivatives, and to methods of using these solutions or dispersions, particularly to treatments for improving the heat resistance of chromate conversion coatings on aluminum and to treatments for improving the rinsability of plastic and painted surfaces.

2. Statement of Related Art

The need for applying protective coatings to metal surfaces for improved corrosion resistance and paint adhesion characteristics is well known in the metal finishing art as well as in other metal arts. Traditionally, metal surfaces are treated with chemicals which form a metal phosphate and/or metal oxide conversion coating on the metal surface to improve the corrosion resistance and paint adhesion thereof. The conversion coated metal surfaces are also generally rinsed or post-treated with a solution containing a hexavalent chromium compound for even greater corrosion resistance and paint adhesion.

Because of the toxic nature of hexavalent chromium, expensive wastewater treatment equipment must be employed to remove the residual chromates from plant effluent to comply with environmental regulations and to improve the quality of rivers, streams, and drinking water sources. Hence, although the corrosion resistance and paint adhesion characteristics of conversion coated metal surfaces can be enhanced by an after-treatment solution containing hexavalent chromium, these environmental disadvantages have led in recent years to much research and development in an effort to uncover effective alternatives to the use of post-treatment solutions containing hexavalent chromium. One alternative to the use of hexavalent chromium involves the use of derivatives of polyphenol compounds such as polyvinyl phenol. Suitable derivatives and suitable treatment solutions are disclosed in earlier U.S. Pat. Nos. 4,517,028 of May 14, 1985, 4,433,015 of Feb. 21, 1984, and 4,376,000 of Mar. 8, 1983 to Lindert and 4,457,790 of, Jul. 3, 1984 to Lindert, et al.; all of which, to the extent not inconsistent with any explicit statement herein, are expressly incorporated herein by reference.

In the treatment of articles for subsequent painting or decorative coatings, including metals and plastics, the parts or articles are normally cleaned with conventional cleaner systems. Plastic and painted surfaces when cleaned with conventional, non-etching, acidic or alkaline cleaner systems, produce a hydrophobic, non-water wettable surface. This non-wettable surface is due to the hydrophobic nature of the surface being treated. As expressed by W. A. Zisman, "Relation of the Equilibrium Contact Angle to Liquid and Solid Constitution", in R. F. Gould (editor), *Contact Angle, Wettability, and Adhesion* (American Chemical Society, Washington, 1964):

[H]ard solids have surface free energies ranging from about 5000 to 500 ergs per sq. cm., the value being higher the greater the hardness and the higher the melting point. Examples are the ordinary metals, metal oxides, nitrides, and sulfides, silica, glass, ruby, and diamond. Soft organic solids have much lower melting points and the surface free energies are generally under 100 ergs per sq. cm. Examples are waxes, solid organic polymers, and in fact, most solid organic compounds. Solids having high specific surface free energies may be said to have "high-energy surfaces" and solids having low specific surface free energies have "low-energy surfaces." . . .

Because of the comparatively low specific surface free energies of organic and most inorganic liquids, one would expect them to spread freely on solids of high surface energy, since there would result in a large decrease in the free energy of the system, and this is most often found to be true. But since the surface free energies of such liquids are comparable to those of low energy solids, among these liquids should be found those exhibiting nonspreading on low-energy solids.

As a result of this fundamental difference between metal and plastic or painted surfaces, even perfect cleanliness of the latter type of surfaces is not sufficient to assure ready wetting of the plastic and painted surfaces by water. Accordingly, one problem to be solved by the present invention is to provide a method for conferring on plastic and painted surfaces sufficient hydrophilicity to enable them to be rinsed with water without forming water breaks, while not damaging adhesion of subsequently applied coatings to the plastic and painted surfaces thus treated.

DESCRIPTION OF THE INVENTION

In this description, except in the working examples and claims and wherever expressly indicated to the contrary, all numerical specifications of amounts of materials or conditions of reaction or use are to be understood as modified by the term "about" in describing the broadest scope of the invention. Practice of the invention within the exact numerical limits given is generally preferred. Also, all parts and percentages are by weight unless otherwise indicated. Furthermore, in the absence of any explicit description to the contrary, the description of a group of materials as suitable or preferred for any particular embodiment of the invention shall be understood as implying that mixtures of any two or more members of the group so described are equally suitable or preferred for the same embodiments, and the specification of materials in ionic form shall be understood to imply the presence of counterions as needed to maintain electrical neutrality of compositions. Such counterions generally may be freely selected, except for avoiding any counterions that frustrate or impede the stated purposes and objectives of the invention.

SUMMARY OF THE INVENTION

In accordance with the present invention, novel compositions, solutions and dispersions, and methods are provided for use in protective or decorative metal, plastic, and painted surface treatment, including the treatment of previously untreated bare metal surfaces, the post-treatment of phosphate conversion coated or other conversion coated metal surfaces such as chromated surfaces, the treatment of plastic and painted surfaces to improve the ease of rinsing the surfaces, and the application of a paint or other decorative coating or film, and the like. Other embodiments of the present invention include compositions and methods that are particularly useful for treating various metal surfaces including aluminum, steel, and zinc metal surfaces and compositions and methods particularly useful for plastic and/or painted surfaces. The compositions, solutions and dispersions, and methods of the present invention provide a coating on metal surfaces which is effective in enhancing their corrosion resistance and/or adhesion of subsequently applied paints and the like to the treated metal surface whether previously conversion coated or not.

A key feature of all embodiments of the present invention is the use of a soluble or dispersible compound selected from the group consisting of any one of the following Polymer Materials I, II or III (characterized below), solutions or dispersions of these Polymer Materials, their salts, and mixtures thereof. Salts include the acid and alkaline salts thereof. The methods of the present invention comprise contacting a surface with treatment compositions as described herein. Polymer Materials I, II, and III are as follows.

Polymer Material I

Polymer Material I comprises a material, preferably a homo- or co-polymer compound, having at least one repeating unit having the formula:

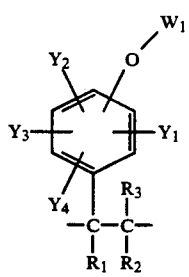

wherein:
each of $R_1$, $R_2$, and $R_3$ are independently selected for each repeating unit from hydrogen, an alkyl group having from 1 to 5 carbon atoms, or an aryl group having 6 to 18 carbon atoms;

each of $Y_1$ through $Y_4$ is independently selected for each repeating unit from hydrogen, "Z" as defined below, $-CR_{11}R_5OR_6$, $-CH_2Cl$, or an alkyl or aryl group having from 1 to 18 carbon atoms,; preferably at last a fraction of $Y_2$, with increasing preference at least 1%, one sixth, or one half, of at least $Y_2$ in at least one of the repeating units is Z; and Z is:

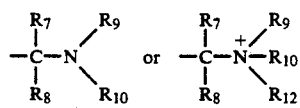

wherein each of $R_5$ through $R_{12}$ (with a possible exception for $R_{12}$ as noted below) is independently selected within each repeating unit and independently selected for each repeating unit from hydrogen, an alkyl, an aryl, a hydroxy- or polyhydroxy-alkyl, an amino-alkyl, a mercapto-alkyl, or a phospho-alkyl moiety; preferably at least one of $R_9$ and $R_{10}$ is not hydroxy-alkyl or polyhydroxy-alkyl. Preferably, $R_1$ and $R_7$ through $R_{12}$ have, in total, carbon chain lengths up to that at which the compound is no longer soluble or dispersible in a suitable surface treatment carrier, such as water. $R_{12}$ can also be $-O^{(-1)}$ or $-OH$ (oxygen or hydroxy) in order to form an amine oxide or a hydroxyl amine;

$W_1$ is independently selected for each repeating unit from the group consisting of hydrogen; an acyl; an acetyl; a benzoyl; a 3-allyloxy-2-hydroxy-propyl-; a 3-benzyloxy-2-hydroxy-propyl-; a 3-alkylbenzyloxy-2-hydroxy-propyl-; a 3-phenoxy-2-hydroxy-propyl-; a 3-alkylphenoxy-2-hydroxy-propyl-; a 3-butoxy-2-hydroxy-propyl; a 3-alkyloxy-2-hydroxy-propyl; a 2-hydroxyoctyl-; a 2-hydroxy-alkyl-; a 2-hydroxy-2-phenyl ethyl-; a 2-hydroxy-2-alkyl phenyl; an iso-propenyl-; a propenyl-; a benzyl-; an alkyl; an allyl; an alkyl benzyl-; a haloalkyl-; a haloalkenyl; a 2-chloro-propenyl-; a sodium; a potassium; a tetra aryl ammonium; a tetra alkyl ammonium; a tetra alkyl phosphonium; a tetra aryl phosphonium; or a condensation product of ethylene oxide, propylene oxide, or a mixture or copolymer thereof.

It will be appreciated that the depiction above represents a repeating unit that characterizes the compound or materials of the present invention; no terminating end units are depicted. The end groups of the polymers of the present invention can be selected by the skilled artisan relying upon art-disclosed techniques. For example, the end groups of the polymer may either be those resulting from the specific polymerization process employed or those intentionally added to alter the polymer characteristics. For example, the end groups may be hydrogen, hydroxyl, initiation fragments, chain transfer agents, disproportionation groups, or groups resulting from other methods of terminating a growing polymer chain.

Polymer Material II

Polymer Material II comprises copolymers of alkenylphenols and substituted alkenylphenols as described for Polymer Material I co-polymerized with one or more other types of monomers. Preferably the comonomers possess an ethylenically unsaturated C=C bond. Materials having C=C moieties and other useful copolymerizable monomer components for use in the present invention can be selected from a variety of unsaturated materials as depicted in the following list. The material may be selected from the group consisting of acrylonitrile, methacrylonitrile, methyl acrylate, methyl methacrylate, vinyl acetate, vinyl methyl ketone, isopropenyl methyl ketone, acrylic acid, methacrylic acid, acrylamide, methacrylamide, n-amyl methacrylate, styrene, m-chlorostyrene, o-chlorostyrene, p-chlorostyrene, n-decyl methacrylate, N,N-diallylmelamine, N,N-di-n-butylacrylamide, di-n-butyl itaconate, di-n-butyl maleate, diethylaminoethyl methacrylate, diethyleneglycol monovinyl ether, diethyl fumarate, diethyl itaconate, diethyl vinylphosphonate, vinylphosphonic acid, diisobutyl maleate, diisopropyl itaconate, diisopropyl maleate, dimethyl fumarate, dimethyl itaconate, dimethyl maleate, di-n-nonyl fumarate, di-n-nonyl maleate, dioctyl fumarate, di-n-octyl itaconate, di-n-propyl itaconate, n-dodecyl vinyl ether, ethyl acid fumarate, ethyl acid maleate, ethyl acrylate, ethyl cinnamate, N-ethylmethacrylamide, ethyl methacrylate, ethyl vinyl ether, 5-ethyl-2-vinylpyridine, 5-ethyl-2-vinylpyridine 1-oxide, glycidyl acrylate, glycidyl methacrylate, n-hexyl methacrylate, 2-hydroxyethyl methacrylate, 2-hydroxypropyl methacrylate, isobutyl methacrylate, isobutyl vinyl ether, isoprene, isopropyl methacrylate, isopropyl vinyl ether, itaconic acid, lauryl methacrylate, methacrylamide, methacrylic acid, methacrylonitrile, N-methylolacrylamide, N-methylolmethacrylamide, N-alkoxymethylacrylamide, N-alkoxymethylmethacrylamide, N-butoxymethylmethacrylamide, N-vinyl-caprolactam, methyl acrylate, N-methylmethacrylamide, m-methylstyrene, o-methylstyrene, p-methylstyrene, 2-methyl-5-vinylpyridine, n-propyl methacrylate, sodium p-styrene sulfonate, stearyl methacrylate, styrene, p-styrene sulfonic acid, p-styrenesulfonamide, vinyl bromide, 9-vinylcarbazole, vinyl chloride, vinylidene chloride, 1-vinylnaphthalene, 2-vinylnaphthalene, 2-vinylpyridine, 4-vinylpyridine, 2-vinylpyridine N-oxide, 4-vinylpyrimidine, and N-vinylpyrrolidone.

It will be appreciated by those skilled in the art that the alkenylphenolic moieties of the present invention can be either randomly distributed within the copolymer (the term "polymer" being used herein to include any number of monomers in excess of one) or can be synthesized to constitute a block polymer, depending upon the methods and conditions used for polymerization.

Polymer Material III—Condensation Polymers

A "condensation polymer", for the purposes of this description, is a material wherein forms of Polymer Materials I or II as defined above, or mixtures thereof, which have been modified if necessary to be condensable as noted below, are condensed with a second compound selected from the group consisting of phenols (preferably phenol, alkyl phenol, aryl phenol, cresol, resorcinol, catechol, or pyrogallol), tannins (both hydrolyzable or condensed), novolak resins, lignin compounds, and mixtures thereof, together with an aldehyde, ketone, or mixture thereof, to produce a condensation resin prepolymer product that is a prepolymer of Polymer Material III. The condensable or modified starting materials are modified by initially excluding the "Z" moiety prior to initiating condensation; an additional modification to make the starting materials condensable will also be appreciated as necessary in that Y1 through Y4 cannot be Z, —CR11R5OR6, or —CR4-R5OR6. The "Z" moiety (as described above) is then added later to these condensation prepolymers by further reacting the condensation resin with (1) an aldehyde, ketone, or mixtures thereof, and (2) a secondary amine to produce an adduct which can react with acid and/or can be reacted with hydrogen peroxide to generate an amine oxide and can be used in water or in an organic solvent. If desired the amine oxide can be acid neutralized to form the hydroxylamine.

While this condensation product is described for convenience as being prepared by a sequential reaction, it will be appreciated that these materials can be prepared by carrying out the necessary steps in any order, or simultaneously. However, the sequence described is preferred.

Description of Preferred Embodiments

One particular group of soluble or dispersible polymers often preferred for use in various embodiments of the invention is the group made, or having a structure the same as would be made, by condensing an aldehyde or ketone, preferably formaldehyde, with an amine or NH$_3$ and a ketose or aldose having from about 3 to about 8 carbon atoms with a poly{vinyl phenol} polymer; or by condensing an alkylaminopolyhydroxy compound having from about 3 to about 8 carbon atoms with a poly{vinyl phenol} polymer. Preferred aldoses, ketoses, and derivatives for use in the above materials include glucose, fructose, alditols such as mannitol, aribanose, mannose, ribose, ribitol, and the like. Acids such as aldonic and aldaric acids may also be employed. Disaccharides and polysaccharides that can be easily hydrolyzed under reaction conditions to one or more of the useful aldoses and ketoses may also be employed.

In a typical protective metal surface treatment operation employing this invention, the metal to be treated is initially cleaned by a chemical or physical process and then water rinsed to remove grease and dirt from the surface. The metal surface is then brought into contact with the treatment solution of this invention. Alternatively, and preferably, instead of contacting the metal surface with the treatment solution of this invention immediately following the cleaning process, a conversion coating solution is applied to or otherwise used to pre-treat the metal surface in a conventional manner to form a conversion coating thereon. Then the conversion coated surface is water rinsed and the metal surface is brought into contact with the treatment solutions of the present invention. Although solutions and/or dispersions of the invention can be effectively applied to treated or untreated metal surfaces, in general the present invention is particularly useful if the metal surface has previously been conversion coated and the invention is accordingly used as a post-treatment; accordingly, as used herein, the term "post-treatment" means the treatment of a metal surface which is not bare metal, and preferably has been previously treated with a conventional conversion coating process. Such conversion coatings are well known and have been described, for example, in *Metal Handbook*, Volume II, 8th Edition, pp. 529-547 of the American Society for Metals and in *Metal Finishing Guidebook and and Directory*, pp. 590-603 (1972), the contents of both of which, to the extent not inconsistent with any explicit statement herein, are expressly incorporated by reference herein.

The compositions and processes of the present invention are useful in treating a broad range of metal surfaces, including metals having surfaces that have been conversion coated with suitable conversion coatings such as iron phosphate, manganese phosphate, zinc phosphate, and zinc phosphate modified with calcium, nickel, or manganese ions. Examples of suitable metal surfaces include zinc, iron, aluminum and cold-rolled, polished, pickled, and hot-rolled steel and galvanized steel surfaces. As used herein, the term "metal surface"

includes both untreated metal surfaces and conversion coated metal surfaces. A particularly preferred metal surface is one produced by conventional chromating or chrome-phosphating treatment of aluminum or an alloy containing at least 40% by weight of aluminum. Treatment of previously chromated or chrome-phosphated aluminum alloys 7075 and 6061 is particularly preferred, with treatment of the latter more preferred.

The polyphenol compounds of the present inventions include Polymer Materials I, II and III, their salts, and mixtures thereof. The treatment compositions of the present invention comprise an effective amount of a soluble or dispersible treatment compound ("Polymer Material") in a carrier that is suitable for surface treatment, i.e., one that allows the selected Polymer Material to be deposited or otherwise conveniently contacted with the surface of, for example, a metal.

Preferred Polymer Materials are based on a vinyl phenolic moiety or a methyl vinyl phenolic moiety. For example, a vinyl phenol or isopropenylphenol and derivatives thereof may be used.

In one embodiment, the surface treatment solutions of this invention comprising Polymer Materials I, II, or III as otherwise defined above are preferably dissolved or dispersed in a carrier suitable for depositing or otherwise placing the Polymer Material on the surface of a metal, i.e., as a metal surface treatment, metal surface post treatment, a paint, protective film, or as a component of any of the foregoing.

These Polymer Materials of the present invention may be made soluble or dispersible in water or organic solvent-type carriers. They may therefore be employed as a treatment solution when dissolved in water or in an organic solvent such as, for example, ethanol. Preferably, however, the Polymer Material selected is used in aqueous solution with water as a carrier.

Accordingly, it is highly desirable to provide or improve the water solubility or water dispersibility of the selected Polymer Material. This is preferably done with an acid used for neutralization and/or complexation of a "Z" moiety thereof. Such acids may be organic or inorganic. Useful and preferred acids for this purpose include carbonic acid, acetic acid, citric acid, oxalic acid, ascorbic acid, phenylphosphonic acid, chloromethylphosphonic acid, mono, di and trichloroacetic acid, trifluoroacetic acid, nitric acid, phosphoric acid, hydrofluoric acid, sulfuric acid, boric acid, hydrochloric acid, hexafluorosilicic acid, hexafluorotitanic acid, hexafluorozirconic acid, and the like; these may be employed alone or in combination with each other and may be neutralized by conventional acid-base reactions or by complexing. In a highly preferred embodiment, the addition of water to the neutralized, overneutralized, or partially neutralized treatment compounds mentioned above results in a water soluble or dispersible solution or emulsion of the polymer useful for metal treatment.

Alternatively, the final Polymer Material/polyphenol compounds of the present invention can be made water soluble or dispersible by neutralization of the phenolic group with an organic or inorganic base. Suitable bases for this purpose include tetraalkylammonium hydroxides such as tetrabutylammonium hydroxide, tetra aryllammonium hydroxide, sodium hydroxide, potassium hydroxide and the like.

In a highly preferred embodiment, the final Polymer Material can be prepared such that the "Z" moiety does not require neutralization, i.e., is an amine oxide or the like.

Within the Polymer Materials, the ratio of any single monomer to any other monomer can be 1:99 to 99:1, preferably 5:1 to 1:5, and more preferably 1.5:1 to 1:1.5.

The molecular weight of the polyphenols used in the preparation of derivatives claimed in the present invention can be a dimer, but may preferably be low molecular weight oligomers or resinous polymers having molecular weights in the range of 360 to 30,000 or greater. The upper limit molecular weight of materials useful in surface treatment compositions is generally determined by the functional limitation that the derivative therefrom must be soluble or dispersible in the selected carrier. The resulting derivatives of the formulas set forth hereinabove will typically have a molecular weight of up to 2,000,000 with molecular weights within the range of 700 to 70,000 being preferred.

Typically, the pH of an aqueous solution treatment according to the present invention will vary from 0.5 to 14. Preferably the aqueous solution will have a pH of from 2.0 to 12 both for the stability of the solution and for best results on treated metal surfaces.

It is contemplated that the compositions and treatment solutions of the present invention can be used to treat the surface of a variety of materials, particularly metal and plastic or "plastic-like" surfaces. Preferred metal surfaces include iron-, zinc- and aluminum-based metals. Preferred "plastic-like" material surfaces include resin or polymeric materials, including thermoplastic and thermosetting materials, as well as natural rubbers, mixtures of these materials, dried paints, lacquers, varnishes, top coats, and the like.

The coating applied may be for protection or decorative in nature, or may be a preparation of the surface for another treatment; it may also serve several functions at once.

The thickness of the final dry or cured coating will depend on its purposes or functions, and may typically range from 0.0025 micrometers (hereinafter "$\mu m$") to 225 $\mu m$ or greater. The typical and preferred metal surface treatment for an intermediate coating, such as a conversion type corrosion resistant paint base coating, is in the range of 1.25 $\mu m$ and below, and more preferably 0.0025 $\mu m$ to 1.25 $\mu m$. When used as a paint or decorative and protective outermost surface treatment, the preferred coating thickness is 1.25 $\mu m$ and above, more preferably 1.28 $\mu m$ to 625 $\mu m$, and still more preferably 1.28 to 250 $\mu m$.

It is further contemplated that the treatment compounds of the present invention may generally be used in surface treatment compositions over a wide range of concentrations. It will be appreciated that the levels of use or useful ranges will vary with many factors well-known to the skilled artisan. Useful levels of the compositions of the present invention dissolved or dispersed in a carrier may be in the range of 0.001% to 80%, depending upon the ultimate use. For example, when used as a pre- or post-treatment of a metal surface, useful levels typically include a dilute to moderate concentration of from 0.001% to 20%, preferably 0.001% to 10%, and still more preferably 0.001% to 5% by weight. Practically speaking, a concentration of 0.0025 to 1% is preferred in metal surface treatment compositions (especially for iron-, zinc-, or aluminum-based metal surfaces). However, under some circumstances (for example when transporting or storing the solution or when using it in a "dry-in-place" system), a concentrate of the solution may be preferred. Higher levels (for example, as high as 80% by weight) may also be employed when the treatment composition is part of a paint system.

Of course, the treatment solutions of the present invention can also comprise ingredients typically found in other similar treatment compositions, (e.g., conversion coating compositions) in addition to the polymer compound that is characteristic of this invention. For example, the treatment solution may optionally comprise an effective amount of a treatment compound according to the present invention, and from 0.001% to 3.0% of metal ions. Metal ions useful for metal treatment in combination with polyphenols of this invention include first row transition metals generally, Group IV-B metals generally, iron, nickel, cobalt, vanadium, chromium, titanium, zirconium hafnium, scandium, yttrium, lanthanum, and the lanthanoid and actinoid metals, as well as molybdenum and tungsten. In addition, tin, silicon, and aluminum compounds, and in particular their oxides, in combination with the materials of the present invention can be used to improve both the effectiveness or performance of the treatment solution in use. Such materials may also reduce the time of application of treatment solution to the metal surface to as short a time as 2 to 5 seconds as might be required on a coil coating line. Complex fluoride materials may also be employed. For example, suitable complex fluoride materials include: $BF_4^{(-1)}$, $NH_4HF_2$, hexafluoride and the like.

It should be appreciated that the addition of metal ions may result in the formation of polymer-metal ion chelation compounds.

The Polymer Materials of the present invention may also be employed in surface treatment compositions and surface treatment methods other than those described above. For example, the Polymer Material of the present invention may be employed as a component of a dry-in-place system, a paint system, or as an additive in a system needing a crosslinking agent.

For example, the Polymer Materials of the present invention may be used in a film forming composition that includes a pigment, i.e. may be used as a paint. They may also be employed as an additional component in conjunction with other polymeric materials in a paint system. The Polymer Materials of the present invention are particularly useful in cathodic electrocoat surface treatment compositions. Such protective, functional and/or decorative surface treatment solutions preferably employ typical electrocoat/electrodeposition additives at their art-established levels. The polymer materials of the present invention may be employed as a solubilizing polymer and/or binder in an electrocoat paint. They may be so employed alone or in conjunction with other binder resins. For example, such paint compositions may optionally include pigments (both organic and inorganic); film forming resins, binders such as epoxies, oils, alkyds, acrylics, vinyls, urethanes, phenolics, etc.; and solvents including hydrocarbons, chlorinated aliphatics and aromatics, alcohols, ethers, ketones, esters; nitrated materials; and particulate zinc.

Further, the Mannich derivatives of the present invention when employed with other binders will also act as a crosslinking agent to produce a highly crosslinked coating upon curing or drying of the film. Accordingly, these Mannich derivatives may be part of or all of the needed crosslinking agent and binder in the paint system.

The compositions and materials of this invention can be used alone or in conjunction with other resins as polymeric coatings on surfaces. These coatings will crosslink or self-crosslink and can be used in conjunction with other crosslinking agents such as melamine formaldehyde or urea-formaldehyde resins as well as phenolic resins, epoxy resins, isocyanates and blocked isocyanates. The Mannich adducts can also be used to crosslink with vinyl functionality as is present in resins such as diallylmelamine, butadiene, multifunctional acrylic oligomers, unsaturated fatty acids in alkyd resins, fatty acid modified epoxy resins, and the like.

Application of the treatment compositions of the present invention in the treatment step to a metal or other desired surface can be carried out by any conventional method. (While it is contemplated that the metal surface will preferably be a conversion coated metal surface, the treatment step can alternatively be carried out on an otherwise untreated metal surface to improve the corrosion resistance and paint adhesion thereof.)

For example, the treatment composition can be applied by spray coating, roller coating, or dipping. The temperature of the solution applied can vary over a wide range, but is preferably from 21° C. to 71° C. After application of the treatment solution to the metal surface, the surface can optionally be rinsed, although good results can be obtained without rinsing after treatment. Rinsing may be preferred for some end uses, for example, in electrocoat paint application.

Optionally, the treated metal surface is dried. Drying can be carried out by, for example, circulating air or oven drying. While room temperature drying can be employed, the use of elevated temperatures is preferred to decrease the amount of drying time required.

After drying (if desired) the treated metal surface is then ready for painting (with or without the Polymer Materials of the present invention) or the like. Suitable standard paint or other coating application techniques such as brush painting, spray painting, electro-static coating, dipping, roller coating, as well as electrocoating, may be employed. As a result of the treatment step of the present invention, the conversion coated surface normally has improved paint adhesion and corrosion resistance characteristics.

Suitable Polymer Materials having one of the above general formula can conveniently be made by a Mannich type reaction. For example, the Polymer Material of the present invention can be prepared by reacting a polyphenol with aldehyde and an amine to yield a product which can be neutralized with an organic or inorganic acid to yield a water soluble or dispersible solution or emulsion of the treatment compound of this invention.

Suitable amines for use in a Mannich-type reaction may be selected from methylethylamine, dimethylamine, diethylamine, diethanolamine, dipropylamine, di-n-butylamine, diisoamylamine, dibenzylamine, methyldiethylethylenediamine, methylaniline, piperidine, 1,2,3,4-tetrahydroisoquinoline, 6-methoxy-1,2,3,4-tetrahydroisoquinoline, morpholine, piperazine, α-methylaminopropiophenone, α-acetylethylbenzylamine; benzyl-(2-cyclohexanonylmethyl)-amine, 3,4-methylenedioxybenzyl-(2-cyclohexanonylmethyl)-amine, N-methyl-glucamine, glucosamine, and t-butylamine; or mixtures thereof.

Although other aldehydes can be employed in the Mannich type reaction, formaldehyde is preferred and is preferably used in the form of a 20-40% aqueous solution or as paraformaldehyde.

One skilled in the art will be familiar with suitable conditions for carrying out a Mannich type reaction. The reaction time generally depends upon the nature and concentration of the reactants employed and reaction conditions such as temperature. Generally, about 1.00 molecular equivalent of the polyphenol, about 1.00 to 1.10 molecular equivalents of the amine, and about 1.0 to 2.0 molecular equivalents of formaldehyde are employed in the reaction. Upon completion of the reaction, the reaction product is recovered and can be neutralized with acid to a pH of from about 1 to about 8 to provide a concentrated treatment solution of the present invention. Typically the concentrate contains from 25 grams per liter to 400 grams per liter solids. For transportation, the reaction product can be stored in a high concentration form as stated above.

A particularly preferred specific embodiment of the invention is the post treatment of previously chromated or chrome-phosphated aluminum and aluminum alloy surfaces as noted briefly above. For this embodiment, there is preferably used a Polymer Material of Type I as described above, in which $W_1$, each of $R_1$ through $R_3$, each of $R_7$ and $R_8$, and each of $Y_1$ through $Y_4$ except $Y_2$ are all hydrogen; each of $R_5$ and $R_6$ is hydrogen or an alkyl group containing from 1 to 5 carbon atoms, more preferably hydrogen; the —OH group is in the position para to the point of attachment of the phenyl ring to the polymer backbone chain; $Y_2$ is Z or hydrogen, and with increasing preference, at least 1%, one-sixth, one-half, or three-quarters of the total of all the $Y_4$ groups present are Z; $R_{12}$ if present is oxygen or hydroxyl; and each of $R_9$ and $R_{10}$ is selected from the group consisting of alkyl, hydroxy- and polyhydroxyalkyls and mixtures thereof. More preferably, the Polymer Material for this specific embodiment has a chemical structure that could be produced by substituting Z moieties on some or all of the phenyl rings in a homopolymer of 4-vinyl phenol, and each of $R_9$ and $R_{10}$ is selected independently for each Z moiety from the group consisting of methyl, ethyl, 2-hydroxyethyl, 2-hydroxypropyl, 2-hydroxybutyl, and —$CH_2$—$(CHOH)_x$—$CH_2OH$, where x is an integer in the range from 2 through 5, most preferably 4 or 5.

As a rinse aid treatment composition for plastic and painted surfaces the polymer is formulated with surfactants to produce a low foaming aqueous solution or dispersion and to wet the plastic surface, bringing the polymer into intimate contact with the plastic surface. In the practice of this invention, the preferred surfactant employed is a mixture of an anionic surfactant and a nonionic surfactant to provide a low foaming aqueous dispersion which will result in no spotting during the treatment and will provide a water break-free film in treatment. Typically in cleaning (an acidic or alkaline composition combined with surfactants) and rinsing plastic or painted surfaces the rinse water will bead up affording a non-continuous system rendering it difficult to determine if the entire surface is clean from oil, fingerprints and the like to which subsequent painting would not adhere well. With the treatment of the present invention, a 100% water break-free film is provided after rinsing, which is a continuous film showing no breaks and, accordingly, no portions of the surface to which paint would not subsequently adhere. In contrast to the 100% water break-free results of the present invention, a broken or discontinuous water film, either beads of water on the surface or spots with no water film, is designated as 0% water break-free, the broken film portions possibly having dirt, grime, oil spots or hard water salt residues over which the water does not provide a film.

The surfactants employed in this invention, are preferably mixtures of an anionic surfactant and a nonionic surfactant as noted earlier hereinabove. The surfactants must be water soluble and preferably provide for low foaming.

The preferred anionic surfactant for use in the present invention are the alkyl sulfates such as sodium 2-ethylhexyl sulfate available commercially as TERGITOL TM 08 from Union Carbide Corporation. Other anionic surfacants of this class, in which the alkyl portions of the surfactant contain up to about 18 carbon atoms, are also available from the same supplier. The preferred nonionic surfactants are the ethoxylated linear alcohols containing about 8 to 22 carbon atoms. ANTAROX TM LF 224, which in an ethoxylated linear alcohol containing 8–10 carbon atoms and having a propylene oxide cap, is of particular use in this invention. ANTAROX TM nonionic surfactants are commercially available from GAF Corp. Other nonionic surfactants are the alkyl and alkyl phenyl ethers of polyethylene glycols also available from Union Carbide under the TERGITOL TM name, in which the alkyl group contains from about 8 to 12 carbon atoms.

In preparing the rinse aid embodiment of the present invention, preferably the surfactants are mixed and the polyphenol polymer added thereto. This is then added to water in an amount to provide the desired concentration for use of the rinse aid. The concentrate composition prior to dissolution in water will preferably comprise about 90–98% of the polyphenol polymer and about 2–10% of surfactant. As indicated, a mixture of anionic and nonionic surfactant is preferred. The mixture will contain the anionic to nonionic surfactant ratio by weight in the range of 1.5–2.0:1. The aqueous dispersion or solution of polymer will preferably contain from 0.1 to 1% v/v polymer.

In the method of using the rinse aid, the plastic or painted articles are first washed and rinsed, using conventional cleaning solutions. Illustrative of such cleaners are PARCO TM Alkaline Cleaner 2202, a potassium hydroxide and tetrapotassium pyrophosphate containing cleaner, and PARCO TM 2501 Acidic Cleaner, a phosphoric acid and monoammonium phosphate containing cleaner, available from Parker+Amchem Division of Henkel Corporation. The articles are generally sprayed with the cleaner and rinsed with warm water after which the rinse aid of the present invention is applied, usually by spraying, although other means of cleaning and rinsing may be employed such as immersion. After application of the rinse aid, the article is rinsed with water, preferably deionized water, and then dried by forced air or oven drying. The invention accordingly includes an improvement in the process of cleaning plastic or painted surfaces wherein a cleaner is applied thereto and rinsed subsequently dried, the improvement being applying to the plastic or painted surfaces subsequent to the cleaning of said surfaces an aqueous solution or dispersion of the polymer described earlier above.

The invention is particularly useful in the treatment of plastic surfaces such as nylon, polyethylene, polypropylene, polyvinyl chloride and certain thermal polyolefins. The use of the rinse aid of the present invention ensures complete cleaning has resulted and will not detract from adhesion of paints applied to plastic surfaces afterwards, as results of testing show 100% adhesion.

Further understanding of the present invention can be had from the following illustrative examples. As used herein "salt spray" refers to salt spray corrosion resistance measured in accordance with ASTM-B117-61. As used herein, "Scotch Tape Adhesion" refers to the 180° T-bend adhesion test as described in ASTM-D3794-79. Panels are scribed in the center and subjected to the ASTM tests. The rating tests for corrosion are measurements of the amount of "creeping" the plant does from the scribe in units of about 1.6 mm (1/16 of an inch). The superscripts represent the number of spots that are present.

EXAMPLE 1

An amount of 80 grams (hereinafter "g") of a resin having an average molecular weight average of about 2400 and a chemical structure corresponding to the formula under the section headed Polymer Material I above, wherein $R_1$, $R_2$, $R_3$, $W_1$, $Y_1$, $Y_2$, $Y_3$ and $Y_4$ are H, is slowly dissolved in 160 milliliters (hereinafter "mls") of PROPASOL TM P (a propoxylated propanol solvent obtained from Union Carbide Corp., Danbury, Conn.) in a 1 liter resin flask, using a high speed mixer. The resin flask is fitted with a blade stirrer, reflux condenser, and nitrogen purge. The resin solution is then charged with 53.5 mls of 2-(methylamino) ethanol ("MEA") and 160 mls deionized water. Gentle heating to 60° C. is started. When 60° C. is reached, addition of 50 mls of 37% formaldehyde is begun and continued over a one hour period. An additional 25 mls PROPASOL TM P is added and the mixture maintained at 60° C. for 1.5 hours. The temperature is raised to 80° C. and held for 1.75 hours. The reaction mixture is allowed to cool to room temperature and 21.8 g of 75% $H_3PO_4$ followed by 960 mls deionized water is added. Alternatively, instead of the phosphoric acid, an amine oxide is formed that does not require the additional neutralization step by adding 0.75 mole of 30% $H_2O_2$ (85 g) to the reaction mixture. The reaction mixture is allowed to stir overnight, and is then diluted with 960 ml of deionized water. The result of this alternative step is a water soluble amine oxide resin that does not require neutralization for water stability.

Dilute solutions of the above formulation were applied to phosphated metal at 120° F. for various times by spray application. In a typical metal treatment operation, the metal to be treated is initially cleaned by a mineral spirits wipe, followed by PARCO TM CLEANER 338 (commercially available from Parker+Anchem Div. of Henkel Corp., Madison Heights, Mich.) for 60 seconds at 160° F., followed by a hot water rinse for 30 seconds, 60 seconds of treatment at 71° C. with a solution of BONDERITE TM 1000 (commercially available from Parker+Anchem Div. of Henkel Corp., Madison Heights, Mich.), 30 seconds cold water rinse, and then the post treatment according to this invention. Some of the panels were rinsed after post-treatment, others were not rinsed. All panels were then baked in a 177° C. oven for 5 minutes.

The treated panels were painted with DURACRON TM 200 paint (from PPG Industries, Pittsburgh, Pa.). The paint was scribed, and the panels subjected to salt spray accelerated testing for 504 hours and compared to PARCOLENE TM 95 and PARCOLENE TM 60 post treated controls. Test results for several variations are provided in Table 1.

TABLE 1

ACCELERATED AND PHYSICAL TESTS

| Post-Treatment | Concentration/pH | 504 Hrs. Salt Spray | Scotch Tape Adhesion |
|---|---|---|---|
| PARCOLENE TM 60 Control | —/pH 4.5 | N | 10 |
| Deionized Water | | 6–8 | 10 |
| Resin of Ex. 1 derivative | 0.1%/pH 6.1 | 0–1$^{2s}$ | — |
| Resin of Ex. 1 derivative | 0.1%/pH 4.0 | 0–1$^{1s}$ | — |
| Resin of Ex. 2 derivative | 0.1%/pH 6.1 | 1–2 | 10 |
| Resin of Ex. 2 derivative | 0.1%/pH 3.8 | 0–1 | 10 |

EXAMPLE 2

Reaction of a higher molecular weight version of the resin used in Example 1, (weight average molecular weight "$M_w$" of 3800, number average molecular weight "$M_n$" of 1300) with MEA and formaldehyde following the same general procedure as for the resin in Example 1. Results are shown in Table 1.

EXAMPLE 3

This example illustrates reaction of vinyl phenol methyl methacrylate co-polymer with methylethanolamine and formaldehyde to produce a composition according to the invention.

An amount of 80 g of a poly-4-vinylphenol methyl methacrylate co-polymer (from Maruzen Oil Co. of U.S.A., Inc., New York, N.Y., having a weight-average molecular weight ("$M_w$") of 14,090 and a number average molecular weight ("$M_n$") of 6,800 and a {Poly[Vinyl Phenol[}/[Methyl MethAcrylate] weight ratio of 57/43) was dissolved in 160 mls of PROPASOL TM P. 29.2 mls (0.36 equivalents) of 99% MEA is added, followed by 160 mls deionized water. The mixture was brought to 45°–50° C., then 27.3 mls (0.36 equivalents) of 37% aqueous formaldehyde was added dropwise over one hour while maintaining the reaction mixture at 45°–50° C. The reaction mixture was then warmed to 80° C. and maintained at this temperature for four (4) hours. After cooling to ambient temperature, 24 g of 75% phosphoric acid and 536 mls deionized water added in portions with good stirring. The resulting solution had a pH of 6.6, and solids content of 13.7%.

The above product was used as a post-treatment for BONDERITE TM 1000 over cold rolled steel 10 centimeter ("cm")×30 cm test panels in concentrations of 0.05%, 0.1% and 0.90% solids and pH values of 6.1–6.2 and 4.0. Application was via spray tank for 15, 30, and 60 seconds. Partial results are listed in Table 2 below for the DURACRON TM 200 paint system.

TABLE 2

| Post-Treatment | Time | 504 Hrs. Salt Spray |
|---|---|---|
| Resin of Example 3 | 15 sec | 1–2 |
| Resin of Example 3 | 60 sec | 1–1 |
| Parcolene 60 | 30 sec | N |
| None | N/A | 2–4 |

EXAMPLE 4

This example illustrates reaction of a polyvinyl phenol novolak co-polymer having an $M_w$ of 4,200 and an $M_n$ 1,330 with methylethanolamine and formaldehyde to form a composition according to this invention.

An amount of 80 g of the novolak copolymer was dissolved in 160 mls of PROPASOL P. 53.5 mls (0.66 equivalents) of MEA and 160 mls of deionized water were added and the temperature brought to 45°–50° C. Next, 50 mls (0.66 equivalents) of 37% formaldehyde was added dropwise over one hour. The temperature was maintained between 45°–50° C. for an additional two hours, raised to 80° C., and maintained at 80° C. for two hours. After cooling to ambient temperature, 21.7 g of 75% phosphoric acid and 993 mls of deionized water were added.

EXAMPLE 5

A polyvinyl phenol-cresol novolak co-polymer ($M_w$ 6,050, $M_n$ 1,600) was reacted in the same proportions with MEA and $CH_2O$ as in Example 4, but had to cook for six hours at 80°–90° C. to reduce formaldehyde concentration to 0.6%. For water solubility, (in 993 mls deionized water), enough 75% phosphoric acid was added to bring the pH of the reaction product to 3.7. Solids content was 12.2%.

EXAMPLE 6

A polyvinyl phenol ("PVP") novolak co-polymer ($M_w$ 3,190, $M_n$ 1,120) was reacted in the same manner as in Example 4, except 46 g of 75% phosphoric acid was required to solubilize the product in water (final pH=4.9).

EXAMPLE 7

A PVP-novolak co-polymer ($M_w$ 3,460, $M_n$ 1,170) was reacted in the same manner as in Example 4, except 61 g of 75% phosphoric acid was needed to solubilize the product in water (final pH=5.0).

Test results for Examples 4–7 are shown in Table 3 below.

TABLE 3

| Post-Treatment | Time | pH | Salt Spray |
|---|---|---|---|
| 0.1% Example 4 derivative | 30 | 4.1 | 0–1$^a$ |
| 0.1% Example 4 derivative | 30 | 6.3 | N |
| PARCOLENE TM 60 | 30 | 4.0 | N |
| None | — | — | 7–8 |
| 0.1% Example 6 derivative | 30 | 6.0 | 0–12$^s$ |
| 0.1% Example 6 derivative | 60 | 6.0 | 0–16$^s$ |
| 0.1% Example 6 derivative | 30 | 4 | 1–3 |
| PARCOLENE TM 60 | 30 | 4.0 | N |
| None | — | — | 4–6 |
| 0.1% Example 7 derivative | 30 | 6.0 | 0–1$^s$ |
| 0.1% Example 7 derivative | 60 | 6.0 | 0–1$^s$ |
| 0.1% Example 7 derivative | 30 | 4.1 | 0–1$^s$ |
| PARCOLENE TM 60 | 30 | 4.0 | 0–1$^s$ |
| None | — | — | 4–6 |
| 0.05% Example 5 derivative | 30 | 6.2 | 0–1 |
| 0.1% Example 5 derivative | 30 | 6.3 | 1–2$^{3s}$ |
| 0.1% Example 5 derivative | 60 | 6.3 | 0–2 |
| 0.1% Example 5 derivative | 30 | 4.0 | 0–1$_2^s$ |
| PARCOLENE TM 60 | 30 | 4.5 | N |
| None | — | — | 5–6$^{9s}$ |

EXAMPLE 8

This example describes reaction of a poly(vinyl phenol) resin, in which 20% of the phenolic hydrogens have been replaced by 2-hydroxy propyl-1,3,5-trimethylhexanoate, with methylethanolamine and formaldehyde.

An amount of 83 g of the resin was dissolved in 271 g Propasol P, 30 g (0.40 equivalents) of MEA was added and the mixture warmed to 60° C. Next, 30 mls (0.40 equivalents) of 37% formaldehyde was added over one hour. The temperature was held at 60° C. for an additional hour, then raised to 80° C. for four hours. A formaldehyde titration of the reaction mixture at this time yielded 0.93% formaldehyde. The mixture was then warmed to 90° C. and held at 90° C. for six hours. Formaldehyde concentration had dropped to 0.4% as measured by titration. After cooling to ambient temperature, 13 g of 75% phosphoric acid and 600 mls deionized water was added with good stirring. The resulting solution had a pH of 6.8 and solids content of 9.5%.

EXAMPLE 9

A polyvinylphenol resin in which 30% of the phenolic hydrogens have been replaced by 2-hydroxy propyl-1,3,5-trimethyl-hexanoate was reacted with methylethanolamine and formaldehyde in the same manner as in Example 8, except the amounts of ingredients was changed to: Propasol P-300 mls; Resin-94.2 g; 99% methylethanolamine-28.4 mls (0.35 mols); 37% formaldehyde-26.3 mls (0.35 mols). The formaldehyde was added over one hour while maintaining the temperature at 60° C.; the reaction mixture was maintained at 60° C. for an additional hour, heated to 90° C. and maintained for an additional four hours. After cooling, enough 75% phosphoric acid to bring the pH to 5.0 and 600 mls of deionized water was added. Solids content for the final product was 13.5%.

The above product was used as a post-treatment for BONDERITE TM 1000 over 10×30 cm cold rolled steel panels as described previously. Some test results are listed in Table 4 below. Times shown in the Table are in seconds.

TABLE 4

| Post-Treatment | Time | 504 Hrs. Salt Spray |
|---|---|---|
| Example 8 derivative | 15 | 0–1$^{2s}$ |
| Example 8 derivative | 60 | 0–1$^{2s}$ |
| PARCOLENE 60 | 30 | N |
| None | — | 6–7 |
| Example 9 derivative | 15 | 0–1$^s$ |
| Example 9 derivative | 60 | 0–1 |
| PARCOLENE 60 | 30 | 0–1 |
| None | — | 7–11 |

EXAMPLE 10

Into a one liter reactor equipped with a reflux condenser, nitrogen sparge, thermocouple, and addition funnel was added 450 ml of butyl CELLOSOLVE TM (Union Carbide). To the solvent over a 90 minute period was slowly added 180 grams of poly-4-vinylphenol powder ($M_w$=5,000) with good agitation. The temperature was then increased to 100° C. to dissolve any resin from the walls of the flask and then 89.25 grams of ARALDITE TM DY 025, (Ciba Geigy) a mono-functional epoxide, was added followed by the addition of 1 gram of N,N-Dimethylbenzylamine. The temperature was gradually increased and the reaction mildly exothermed to 167° C. The reaction mixture was post-heated at 175°–185° C. for an additional 3 hours and then cooled. (The final solids content of the reaction mixture was 40.3% [residue after baking at 177° C. for 15 minutes] indicating a 99% completion of the reaction.)

The epoxide modified poly-4-vinylphenol derivative from above was used in the preparation of a Mannich derivative as outlined below. 90.13 grams of 2-(N-methylamino)-ethanol was added to the reaction product and solvent above, and the mixture was heated to 50° C. Over a 45 minute period 97.4 g of a 37% formaldehyde solution was then added and then the reaction was post-heated for the first 2 hours at 50° C. and then 3 hours at 80° C. (The reaction was found to be complete by titration for residual formaldehyde.)

A portion of the above solution was adjusted to a pH of 6.5 with phosphoric acid and diluted to 17% solids with deionized water. Zinc phosphated cold rolled steel panels (phosphated by treatment with BONDERITE TM EP-1, commercially available from Parker+Amchem Div. of Henkel Corp.) were dipped into the diluted solution of the above polymer and subjected to electrolysis using a DC current, with the test panel being made the cathode and a 316 stainless steel panel being made the anode. The cold rolled steel panels were withdrawn from the treatment bath, rinsed with deionized water and oven baked at 204° C. for 20 minutes. A coating thickness of approximately 15.5 µm was attained. When the coating is tested by treatment with methyl ethyl ketone (MEK) and simultaneously rubbed with a cloth, good solvent resistance is obtained.

The above polymer solution in water was also coated on a zinc phosphated cold rolled steel panel prepared as above by the use of a draw-down bar and then baked at 204° C. for 20 minutes. Again, there were good MEK resistance results after the oven-bake, while without an oven curing step less than favorable MEK test results are obtained. These results indicate that the Mannich derivative of the polymer above is self-crosslinking and can be used to form a coating on a metal surface by either casting a film or by cathodic electrodeposition. Good solvent resistance can be obtained without the addition of external crosslinking agents, although substantially similar results may be obtained by adding external crosslinking agents. Such materials may accordingly be applied either electrolytically or non-electrolytically.

EXAMPLE 11

A Mannich adduct of poly-4-vinylphenol with N,N-diallylamine was prepared as above by reacting the following ingredients.
1. 131.2 grams 30.5% poly-4-vinylphenol in PROPASOL TM P
2. 27.5 grams of Propasol P
3. 33.4 grams of N,N-diallylamine (supplied by Aldrich Chemical Co)
4. 26.4 grams of a 37.9% formaldehyde solution.

The ingredients were mixed and reacted for approximately five hours at 50° C. and then for 2 hours at 80° C. This reaction was characterized by the consumption disappearance of formaldehyde and the reaction stopped when approximately 99% complete.

The product of reaction of poly-4-vinylphenol, N,N-diallylamine and formaldehyde from above was diluted to 17.5% solids with solvent (Propasol P) and applied to a cleaned aluminum panel (#3003 alloy) by spraying. A wet film thickness of 3 mils was obtained; a dry film thickness of approximately 1 mil was attained after baking at 350° C. for ten minutes. MEK (methyl ethyl ketone) solvent resistance of >500 double rubs was obtained.

The above N,N-diallylamine Mannich adduct of poly-4-vinylphenol produced above in Example 11 was mixed in a ratio of approximately 10 parts by weight Mannich adduct to 12 parts by weight Monsanto RJ-101 resin (a stryene-allyl alcohol copolymer supplied by Monsanto). This polymeric coating formulation was applied to an aluminum panel using a draw down bar and baked in a convection oven at 177° C. for 10 minutes. No failure of the cured coating was noted after >500 MEK double rubs. A coating applied by the same method, but omitting the Mannich adduct (i.e., employing only the Monsanto RJ-101 Polymer) failed in approximately 10 MEK double rubs. The above results indicate that the compositions of the present invention, whether used alone or in combination with other agents, are excellent crosslinking agents for polymeric systems and can be used as polymeric coatings possessing self-crosslinking properties.

EXAMPLE 12

This example illustrates the specific embodiment of treating aluminum surfaces after conventional chromating.

Aluminum alloy panels (type 5052) are cleaned for 30 seconds with a conventional alkaline metal cleaner such as that sold by the Parker+Amchem Div. of Henkel Corp. under the trade designation PARCOLENE TM 2244 at 66° C., followed by a 10 second hot water rinse, a 10 second sulfuric acid (pH 2.2) rinse at 120° F., and 10 second cold water rinse. The panels are then coated with a conventional chromate conversion coating, such as that sold by the Parker+Amchem Div. of Henkel Corp. under the trade designation BONDERITE TM 723 to produce a conversion coating weight of either about 0.32 or about 1.2 grams per square meter ("$g/m^2$"), measured as chrome, followed by a 10 second cold water rinse.

The aluminum alloy panels are then post-treated with either the 2-(methylamino) ethanol or N-methylglucamine Mannich adduct of poly(p-vinyl phenol) for 30 seconds at 49° C. by spray application. The aluminum was then either given a 15 second deionized water rinse and squeegee dried, or squeegeed with a solution of the post-treatment solution and then allowed to air dry. Chromic acid post-treated controls and non-chrome conversion coated controls are run for comparison purposes. Panels are then baked at either 177° C. for 20 minutes or 204° C. for 10 minutes to simulate a cure cycle for typical high solids paint. Non-baked controls are also prepared for comparison purposes. The aluminum panels are then subjected to a 168-hour bare salt spray corrosion testing, such as is described in Military Specifications MIL-C-5541C and MIL-C-81706.

After exposure to 168 hours of bare salt spray corrosion, almost all panels give Nil corrosion ratings. Only some none-chrome treated controls fail to give Nil (i.e., substantially free from corrosion products) corrosion ratings. However, some variations result in discolored panels. The results are summarized in Table 5. Compound A is the product of the Mannich reaction of MEA, formaldehyde, and poly(p-vinyl phenol) as generally described above; compound B is product of the Mannich reaction of N-methyl glucamine, formaldehyde, and poly(p-vinyl phenol) as generally described above; and PARCOLENE TM 10 is a chromic acid rinse that is conventionally used in the prior art for post-treating chromate conversion coated aluminum. Where noted in the Table, fluozirconic acid was also added to the post treatment solution.

EXAMPLE GROUP 13

TABLE 5

| B 723 Coating Weight | Post Treatment Solution/ Concentration | pH | Bake (°C.) | Rating |
|---|---|---|---|---|
| 0.32 g/m² | PARCOLENE 10 | — | None | Pass |
| 1.2 g/m² | PARCOLENE 10 | — | None | Pass |
| 0.32 g/m² | PARCOLENE 10 | — | 177 | Fail |
| 0.32 g/m² | PARCOLENE 10 | — | 204 | Fail |
| 1.2 g/m² | PARCOLENE 10 | — | 177 | Pass |
| 1.2 g/m² | PARCOLENE 10 | — | 204 | Fail |
| 1.2 g/m² | A/0.1% | 6.2 | 177 | Pass |
| 1.2 g/m² | A/0.1% | 6.2 | 204 | Pass |
| 1.2 g/m² | A/0.1% | 4.0 | 177 | Pass |
| 1.2 g/m² | A/0.1% | 4.0 | 204 | Pass |
| 0.32 g/m² | B/0.1% | 7.0 | 204 | Pass |
| 1.2 g/m² | B/0.1% | 7.0 | 204 | Pass |
| 1.2 g/m² | B/0.1% | 7.0 | 177 | Pass |
| 0.32 g/m² | B/0.1% | 4.0 | 204 | Pass |
| 1.2 g/m² | B/0.1% | 4.0 | 204 | Pass |
| 1.2 g/m² | B/0.1% | 4.0 | 177 | Pass |
| 0.32 g/m² | B/0.5% | 7.0 | 204 | Pass |
| 1.2 g/m² | B/0.5% | 7.0 | 204 | Pass |
| 1.2 g/m² | B/0.5% | 7.0 | 177 | Pass |
| 0.32 g/m² | B/0.5% | 4.0 | 204 | Pass |
| 1.2 g/m² | B/0.5% | 4.0 | 204 | Pass |
| 1.2 g/m² | B/0.5% | 4.0 | 177 | Pass |
| 0.32 g/m² | B/0.1%/$H_2ZrF_6$ | 4.0 | 204 | Pass |
| 1.2 g/m² | B/0.1%/$H_2ZrF_6$ | 4.0 | 204 | Pass |
| 1.2 g/m² | B/0.1%/$H_2ZrF_6$ | 4.0 | 177 | Pass |
| None | B/0.1%/$H_2ZrF_6$ | 4.0 | 177 | Fail |
| None | B/0.1%/$H_2ZrF_6$ | 4.0 | 204 | Fail |
| None | None | — | None | 25% white rust |

Panels of Type 6061 aluminum alloy were chromate conversion coated in a conventional manner, using the following process steps: Degrease by immersion in methyl ethyl ketone for 5 minutes at ambient temperature; air dry; clean with RIDOLINE TM 53L, 5% solution in water for 5 min at 140° F.; tap water rinse for 5 min; deoxidize the surface with DEOX TM 6/16, 5% solution for 7 minutes at ambient temperature; tap water rinse for 3 min; and ALODINE TM 1200S to produce either about 30 or about 90 mg/square foot of coating. (All products designated by trade mark are available from the Parker+Amchem Div. of Henkel Corp., Madison Heights, Mich.) The chromated panels were then post treated as in Example 12, Compounds A and B, and tested for resistance to corrosion in salt spray as generally described in Example 12. Panels post treated according to the invention as described had better corrosion resistance than other panels with no seal or with sealing coats obtained by treatment with conventional sealing compositions containing hexavalent chromium.

EXAMPLE 14

This example will serve to illustrate the preparation of one polymer employed in an embodiment of this invention directed toward treating plastic and painted surfaces: the methyl glucamine derivative of a poly-4-vinylphenol polymer.

A resin flask is charged with 400 mls Propasol P (a propoxylated propane solvent obtained from Union Carbide Corp., Danbury Conn.) and 160 g of Resin M (a poly-4-vinylphenol resin obtained from Maruzen Oil $M_w$=5000). A slurry of 263.3 g N-methyglucamine in 400 mls of deionized water is added, and the mixture is warmed to 60°-65° C. while stirring. Next, 100.2 mls of 37% formaldehyde is added over one and one-half hours. The mixture is then warmed to 90° C. and held for six hours. After cooling, the mixture is diluted to 9.6% solids with deionized water. The pH of the final solution is 9.1 and the solution comprises an N-methylglucamine derivative.

EXAMPLE 15

The polymer of Example 14 was formulated with surfactants to provide a low foaming aqueous dispersion in water. Thus 975.0 parts of the polymer were added to a previously combined mixture of 18 parts of TERGITOL TM 08 (an anionic surfactant, sodium 2-ethylhexyl sulfate) and 7 parts of ANTAROX TM 224 (a nonionic surfactant). An aqueous solution of the foregoing was prepared in deionized water by adding and mixing the foregoing with water to provide a concentration of polymer by weight of 0.023% and a concentration of surfactant by weight of 0.0045%.

EXAMPLE 16

The formulated rinse aid from Example 15 was then tested using primed plastic parts of polyester, polyvinyl chloride and thermal polyolefin. The panel cleaning and testing of the rinse aid was performed using the following test cycle:

| 1. | PARCO TM Alkaline Cleaner 2202 at 3 oz/gal or | 90 second spray at 125° F. |
|---|---|---|
|  | PARCO TM Acid Cleaner 2501 at 4% by volume | 90 second spray at 125° F. |
| 2. | Warm water (110° F.) rinse | 30 second spray |
| 3. | Rinse aid polymer | 30 second spray at 80° F. |
| 4. | Deionized water rinse | 30 second spray |
| 5. | Forced air blow off | |

The cycle was carried out both with the rinse aid step 3 and without the rinse aid step. All panels processed without the polymer rinse aid showed 0% water break-free after rinsing. All panels processed with the polymer rinse aid showed 100% water break-free after rinsing.

EXAMPLE 17

After drying of the panels treated in Example 16, the panels were painted with Inmont 8L 395094-Base Coat Clear paint. The panels were allowed to age at ambient conditions for a minimum of 72 hours before adhesion testing was conducted. Adhesion testing on the painted panels was evaluated under the following conditions.
a. After oven aging 7 days at 70° C.
b. After 96 hours at 100/100 humidity
c. After 2 hours 100° F. water immersion
d. After a moisture and cold cycle test
e. After 3 months and 1 year Florida exposure.

All the tests showed 100% adhesion on both the treated and non-treated panels illustrating that the treatment did not interfere with the adhesion of paints to the panels and that the rinse aid showing 100% water break-free provided assurance that no oil or grease was left on the panels after cleaning.

What is claimed is:

1. A process for treating a surface selected from the group consisting of plastic and painted surfaces and chromate or chrome-phosphate conversion coated aluminum and aluminum alloy surfaces with a liquid surface treatment composition comprising water and a water dispersible or soluble polyphenol polymer with recurring units according to the formula:

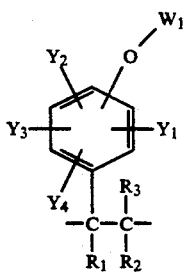

wherein:
each of $R_1$, $R_2$, and $R_3$ is independently selected for each repeating unit from hydrogen, an alkyl group having from 1 to 5 carbon atoms, or an aryl group having 6 to 18 carbon atoms;

each of $Y_1$ through $Y_4$ is independently selected for each repeating unit from hydrogen; "Z" as defined below; —$CR_{11}R_5OR_6$ wherein each of $R_5$ and $R_6$ is independently selected from hydrogen, an alkyl, an aryl, a hydroxy- or polyhydroxy-alkyl, an amino-alkyl, a mercapto-alkyl, or a phospho-alkyl moiety; —$CH_2Cl$; or an alkyl or aryl group having from 1 to 18 carbon atoms, subject to the constraint that at least one sixth of the $Y_2$ groups in the recurring units are Z; and Z is:

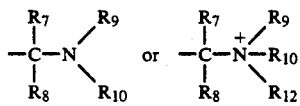

wherein each of $R_7$ through $R_{12}$ (with a possible exception for $R_{12}$ as noted below) is independently selected within each repeating unit for each of $R_7$ through $R_{12}$ from hydrogen, an alkyl, an aryl, a hydroxy- or polyhydroxy-alkyl, an amino-alkyl, a mercapto-alkyl, or a phospho-alkyl moiety, and $R_{12}$ may also be —$O^{(-1)}$ or —OH in order to form an amine oxide or hydroxyl amine, with the proviso that at least one of $R_9$, $R_{10}$, and $R_{12}$ must be a polyhydroxy-alkyl group such as would be contained in an amine formed by reaction of ammonia or a primary amine containing only hydrogen and carbon in addition to nitrogen with a ketose, aldose, or other carboxyl group-containing polyhydroxy compound having from about 3 to about 8 carbon atoms and subsequently reducing the intermediate product of this reaction by hydrogenation to an amine; and $W_1$ is independently selected for each repeating unit from the group consisting of a hydrogen; an acyl moiety; an acetyl; a benzoyl; a 3-allyloxy-2-hydroxy-propyl-; a 3-benzyloxy-2-hydroxy-propyl; a 3-alkylbenzyloxy-2-hydroxy-propyl; a 3-phenoxy-2-hydroxy-propyl-; a 3-alkylphenoxy-2-hydroxy-propyl-; a 3-butoxy-2-hydroxy-propyl-; a 3-alkyloxy-2-hydroxy-propyl-; a 2-hydroxyoctyl-; a 2-hydroxyalkyl-; a 2-hydroxy-2-phenyl-ethyl-; a 2-hydroxy-2-alkyl-phenylethyl-; a benzyl-; an alkyl-; an allyl-; an alkylbenzyl-; a haloalkyl-; or a haloalkenyl such as 2-chloropropenyl-; or a condensation product of ethylene oxide, propylene oxide, or a mixture or copolymer thereof.

2. A process according to claim 1, wherein each of the $W_1$, $Y_1$, $Y_3$, $Y_4$, $R_1$ through $R_3$, and $R_5$ through $R_6$ is hydrogen.

3. A process according to claim 2, wherein the surface treated is a plastic surface and the liquid surface treatment composition also comprises surfactant.

4. A process according to claim 3, wherein said surfactant is a mixture of an anionic and a nonionic surfactant.

5. A process according to claim 4, wherein said anionic surfactant is an alkyl sulfate having from about 8 to 18 carbon atoms and said nonionic surfactant is an ethoxylated linear alcohol having from about 8 to about 22 carbon atoms.

6. A process according to claim 5, wherein said alkyl sulfate is sodium 2-ethyl hexyl sulfate and said ethoxylated linear alcohol has from 8 to 10 carbon atoms.

7. A process according to claim 6, wherein the ratio by weight of the polymer to the total surfactant is within the range from 9:1 to 49:1 and the ratio by weight of said anionic to said nonionic surfactant is within the range from about 1.5:1 to about 2:1.

8. A process according to claim 7, wherein the concentration of the water dispersible or soluble polyphenol polymer containing polyhydroxyl alkylamine functionality is from 0.001 to 1%.

9. A process according to claim 1, wherein the concentration of the water dispersible or soluble polyphenol polymer containing polyhydroxyl alkylamine functionality is from 0.001 to 1%.

10. A process according to claim 1, wherein the surface treated is a chromate or chrome-phosphate conversion coated aluminum and aluminum alloy surface; the polymer materials of Polymer Type 2; and $W_1$, each of $R_1$ through $R_3$, each of $R_7$ and $R_8$, and each of $Y_1$, $Y_3$, and $Y_4$ is hydrogen; each of $R_5$ and $R_6$ is hydrogen or an alkyl group containing from 1 to 5 carbon atoms; the —OH group is in the position para to the point of attachment of the phenyl ring to the polymer backbone chain; $Y_2$ is Z or hydrogen, and at least one-sixth of the total of all the $Y_2$ groups present are Z; and each of $R_9$ and $R_{10}$ is selected from the group consisting of alkyl, hydroxy- and polyhydroxy-alkyls and mixtures thereof.

11. A process according to claim 10, wherein the polymer has a chemical structure that could be produced by substituting Z moieties on some or all of the phenyl rings in a homopolymer of 4-vinyl phenol, and each of $R_9$ and $R_{10}$ is selected independently for each Z moiety from the group consisting of methyl, ethyl, 2-hydroxyethyl, 2-hydroxypropyl, 2-hydroxybutyl, and —$CH_2$—$(CHOH)_x$—$CH_2OH$, where x is an integer in the range from 2 through 5.

12. A process according to claim 11, wherein the surface treated is a chromate or chrome-phosphate conversion coated aluminum alloy selected from the group consisting of alloys 6061, 7075, and 5052.

13. A process according to claim 12, wherein the aluminum alloy is 6061.

14. A process according to claim 10, wherein the surface treated is a chromate or chrome-phosphate conversion coated aluminum alloy selected from the group consisting of alloys 6061, 7075, and 5052.

15. A process according to claim 14, wherein the aluminum alloy is 6061.

16. A process according to claim 15, wherein the concentration of the water dispersible or soluble polyphenol polymer containing polyhydroxyl alkylamine functionality is from 0.001 to 1%.

17. A process according to claim 14, wherein the concentration of the water dispersible or soluble polyphenol polymer containing polyhydroxyl alkylamine functionality is from 0.001 to 1%.

18. A process according to claim 13, wherein the concentration of the water dispersible or soluble polyphenol polymer containing polyhydroxyl alkylamine functionality is from 0.001 to 1%.

19. A process according to claim 12, wherein the concentration of the water dispersible or soluble polyphenol polymer containing polyhydroxyl alkylamine functionality is from 0.001 to 1%.

20. A process according to claim 11, wherein the concentration of the water dispersible or soluble polyphenol polymer containing polyhydroxyl alkylamine functionality is from 0.001 to 1%.

* * * * *